United States Patent

Carlson et al.

Patent Number: 5,352,260
Date of Patent: Oct. 4, 1994

[54] MANUFACTURE OF MINERAL FIBER

[75] Inventors: Robert A. Carlson, Northbrook; William F. Porter, Algonquin; James L. Medwid, Lisle, all of Ill.

[73] Assignee: Industrial Fibers, Inc., Lake Bluff, Ill.

[21] Appl. No.: 121,524

[22] Filed: Sep. 16, 1993

[51] Int. Cl.⁵ .................................. C03B 37/06
[52] U.S. Cl. ........................... 65/469; 65/19; 65/27; 65/480; 65/482
[58] Field of Search ............... 65/2, 6, 8, 15, 4.4, 65/9, 19, 27

[56] References Cited

U.S. PATENT DOCUMENTS

| | | | |
|---|---|---|---|
| 3,469,961 | 9/1969 | Barnhart et al. | 65/19 |
| 4,244,720 | 1/1981 | Boen et al. | 65/8 |
| 4,357,154 | 11/1982 | Hartung | 65/8 |
| 4,711,662 | 12/1987 | Harada | 65/19 |
| 5,255,900 | 10/1993 | Schott | 65/19 |

Primary Examiner—Robert L. Lindsay
Attorney, Agent, or Firm—Dorn, McEachran, Jambor & Keating

[57] ABSTRACT

The initial stages in the manufacture of a glass-like mineral fiber suitable for a multiplicity of industrial uses are essentially conventional; a charge of raw minerals (igneous rock, basalt, slag from a blast furnace or other metal working furnace, phosphate slag, etc.) is melted, then spun and collected to produce a fibrous mineral "blanket". The "blanket" is chopped up, separated, and screened, producing a prilled material constituting a multiplicity of mineral fiber pellets of given average size. These pellets are subjected to brief, rapid acceleration, as by contact with a high-speed toothed rotary wheel, to accelerate and stress the pellets into an industrially usable material constituting a multiplicity of shredded, flake-like mineral fiber elements, at least one such element for each pellet.

7 Claims, 1 Drawing Sheet

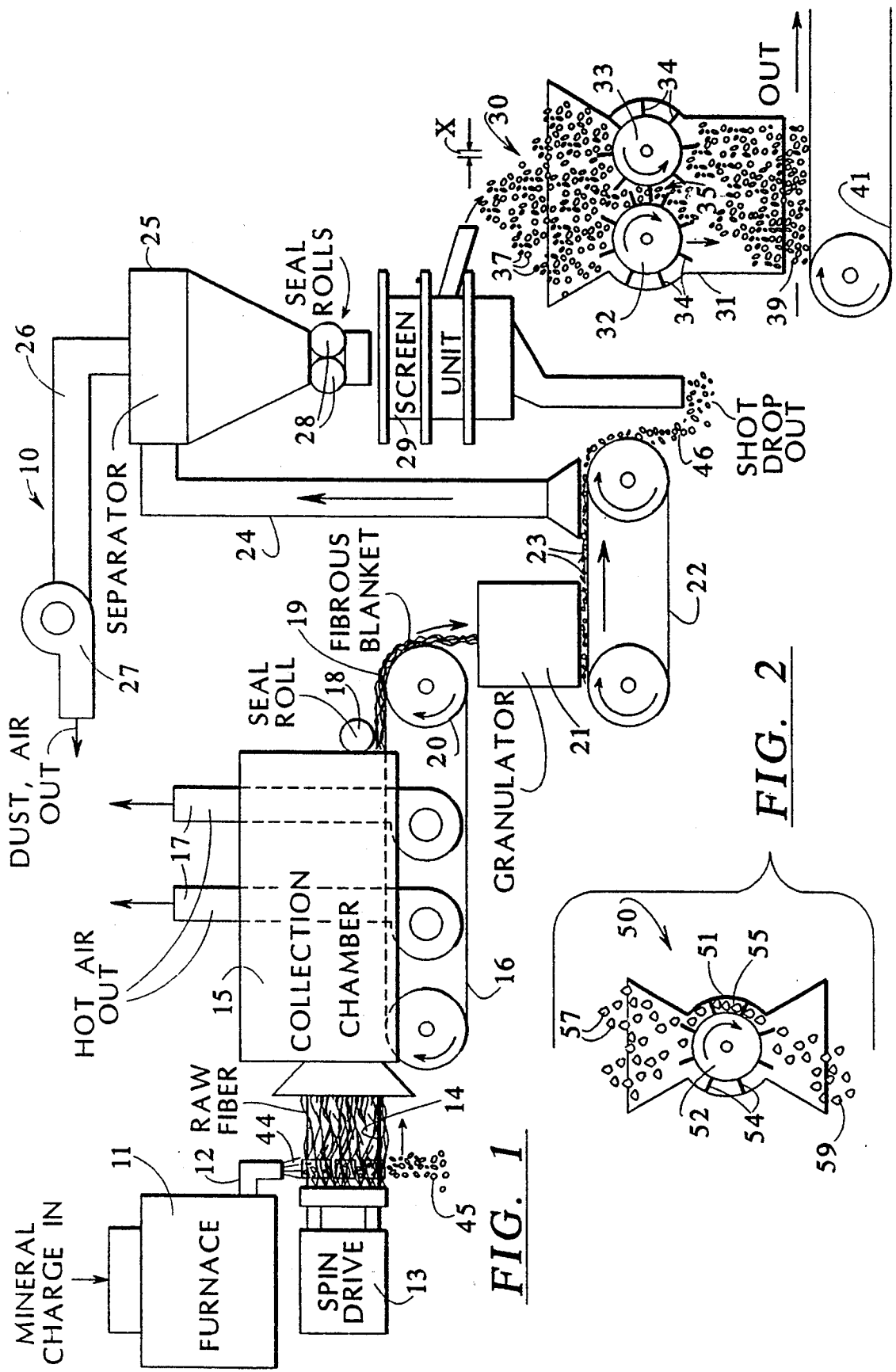

MANUFACTURE OF MINERAL FIBER

BACKGROUND OF THE INVENTION

Mineral fiber is a low cost, fibrous mineral product that can be manufactured from a variety of materials including igneous rock and basalt, from slag produced by the blast furnaces used to make steel and other metals, and from waste products from the phosphate industry. Generally speaking, although mineral fiber has an appearance similar to glass fiber, its chemical composition is significantly different from that of glass fiber, due to high calcium and magnesium content in the mineral fiber and a relatively low proportion of silica and alumina in it. Mineral fiber is suitable for use in many high temperature applications, 1200° to 1800° F. Industrial uses are many and varied.

Known processes for the manufacture of mineral fiber material usually start by melting a mineral charge in any one of a variety of different types of furnace, including cupola melters similar to blast furnaces, electrical furnaces, and gas fired furnaces. The molten material from the initial furnace or melter stage is then spun by any of a variety of means to form discrete fibers. The fibers are then collected in a large chamber from which the output is a fiber blanket, a fiber board, or even pellets of loose fiber.

Most known processes convert only approximately fifty percent to seventy-five percent of the molten minerals into usable mineral fiber. The remainder of the original molten mineral ends up as fine, substantially spherical shot waste, which has little or no useful purpose and constitutes a contamination in the finished product. Separation of this fine, substantially spherical shot waste from the mineral fibers has been attempted; typical techniques include centrifugal air separation, air transport dropout devices, and a variety of screening methods that have used gravity driven inclined screens as well as screens with both oscillating and rotary mechanical drives.

These separation or cleaning techniques, however, may also introduce some substantial problems. Thus, the high aspect ratio (diameter in relation to fiber length) of the fibrous material, in combination with the abundant mechanical contact that occurs in any of the known separation techniques, results in the mineral fiber product becoming clumped or entangled (prilled) into relatively tight, small nodules or pellets. These pellets can be quite difficult to disperse into viscous liquids where they might otherwise be used (e.g. in caulks, plastics, etc.). The pellets can also be difficult to handle in dry, powder-like formations.

STATEMENT OF THE INVENTION

It is a principal invention of the present invention, therefore, to provide a new and improved method and apparatus for the manufacture of mineral fiber material that is effective to convert small, compact nodules or pellets of the fibrous mineral into more open flake-like shredded elements.

Another object of the invention is to provide a new and improved process and apparatus for conversion of small, compact pellets of mineral fiber into shredded, open, flake-like elements without applying substantial force to the pellets and hence without materially damaging or shortening the fibers by breakage.

Accordingly, in one aspect the invention relates to an improved process for the manufacture of a flake-like mineral fiber material, comprising the steps of:

A. melting a charge of raw mineral such as igneous rock, slag from a metal furnace, or the like to produce a molten mineral stream;

B. spinning and attenuating the molten mineral stream of step A to form a fibrous mineral blanket containing some contaminants;

C. severing the fibrous blanket of step B into a multiplicity of small segments; and D. separating the contaminants from the small blanket segments of step C and generating a stream of a multiplicity of mineral fiber pellets of a maximum dimension X.

The process improvement comprises:

E. discharging the stream of mineral fiber pellets from step D into an acceleration passage, no smaller than X, containing an acceleration member;

F. driving the acceleration member through the passage, in contact with the pellets, at a speed sufficient to accelerate and stress the mineral fiber pellets to shred those pellets and form a flake-like mineral fiber material including at least one shredded flake for each pellet; and G. removing the mineral fiber material for use.

In another aspect the invention pertains to a manufacturing system for the manufacture of a flake-like mineral fiber material, that system comprising, in sequence:

furnace means for melting a charge of raw mineral such as igneous rock, slag from a metal furnace, or the like to produce a molten mineral stream;

spinning means to produce mineral fibers from the molten mineral stream;

collecting means for amalgamating the mineral fibers in a fibrous mineral blanket containing some contaminants;

severing means for severing the fiber blanket into a multiplicity of small segments; and separation means for separating contaminants from the small blanket segments and generating a stream of a multiplicity of mineral fiber pellets.

The improvement of the invention comprises an acceleration station including:

an acceleration station housing;

at least one acceleration member positioned in the housing immediately adjacent to an acceleration passage;

input means for directing the stream of mineral fiber pellets, at a moderate speed, into the acceleration passage;

drive means for driving the acceleration member through the acceleration passage at a speed sufficient to stress the mineral fiber pellets, by acceleration, to convert those pellets into a multiplicity of flake-like, open, shredded mineral fiber elements; and an output conveyor.

BRIEF DESCRIPTION OF THE DRAWINGS

FIG. 1 is a schematic illustration of a complete apparatus that performs all process steps necessary to the manufacture of mineral fiber, up to the point where the fiber is ready for packaging; and FIG. 2 is a schematic view of a modification of the final stage of the apparatus of FIG. 1.

DESCRIPTION OF THE PREFERRED EMBODIMENT

The manufacturing system 10 for producing a glass-like mineral fiber, shown in FIG. 1, begins with a cupola furnace 11 at the left-hand side of the figure. Furnace 11 has an outlet 12 that feeds a spinning and attenuating mechanism 14 actuated by a spin drive 13. Spinning mechanism 14 extends to a collection chamber 15 that includes the upper or transport level of a conveyor belt 16. Collection chamber 15 is equipped with one or more exhaust fans 17. The direction of air flow in the collection chamber is controlled in part by a seal roll 18 located at the outlet of the collection chamber.

The material from collection chamber 15, a "blanket" 19, flows over the head pulley 20 of belt conveyor 16 and into a chopper or granulator 21. From granulator 21 the cut-up material 23 is discharged onto a conveyor belt 22. That material 23 is drawn upwardly through a conduit 24 in an air lift to the input of a separator 25. For purposes of the present description, separator 25 is assumed to be a conventional cyclone or centrifugal separator. Separator 25 has a central connection to an outlet duct 26 and an exhaust fan 27 for the purpose of removing dust and excess air from the separator.

The outlet of separator 25, at its bottom, passes through a pair of seal rolls 28 to a screen unit 29. Prills or pellets of a given size are passed from screen unit 29 to the input of an acceleration station 30 which has an external housing 31 and two driven acceleration rolls 32 and 33. Rolls 32 and 33 are each provided with a series of vanes or teeth 34; the two rolls are aligned with each other in the central portion of housing 31, separated by a nip or acceleration passage 35. If each of the nodules entering station 30 has a maximum cross-sectional dimension X, the width of the acceleration passage 35 should be no smaller than X and preferably should be substantially larger than X. Rolls 32 and 33 need not be driven at the same rotational speed; it may be advantageous to drive these rolls at markedly different peripheral speeds.

From acceleration station 30, the fibrous material is transferred to an output conveyor 40 for movement to appropriate packaging equipment.

In the operation of manufacturing system 10, FIG. 1, the initial operation is the melting of a mineral charge in furnace 11. As previously noted, that mineral charge may comprise igneous rock or basalt, slag from a steel blast furnace or other metal-working furnace, or the byproducts of a phosphate process. The molten mineral material is discharged from furnace 11 as a stream 44 through the furnace outlet 12 and into spinning mechanism 14. In the spinning mechanism, the molten material output from furnace 11 is first spun into raw fiber, after which it is collected on conveyor belt 16 in the bottom of collection chamber 15, appearing as a fiber blanket 19 at the output of the collection chamber. Seal roll 18 inhibits entry of air into collection chamber 15 through the chamber outlet. As a consequence, cooling of the raw fiber begins as it enters the collection chamber from spinning mechanism 14, and cooling continues until the fiber blanket 19 leaves the collection chamber. The temperature of the hot air output from the discharge fan 17 is usually of the order of 200° to 250° F.; the entry temperature for the raw fiber passing into collection chamber 15 is very much higher.

As the molten mineral material is discharged from outlet 12 of furnace 11 and is spun and stretched (attenuated) into the fibrous material supplied to collection chamber 15 by mechanism 14, a number of small, shot-like elements 45 tend to form and drop out of the system. These spherical elements 45 are not impurities, nor are they granules in the molten stream 44. The molten material of stream 45 has a high surface tension and low viscosity, characteristics that make it prone to assume a configuration with the smallest surface area to mass (i.e., spherical) during attenuation in mechanism 14. The shot-like material 45 represents waste in the overall operation of system 10, but it can be and usually is recycled to the input of furnace 11.

The fibrous blanket 19 that constitutes the output from collection chamber 15 is supplied to granulator 21, where it is chopped or otherwise broken up into relatively small segments usually having maximum dimensions ranging from two inches to six inches. There is still some shot-like waste trapped in the fibrous material at this point and some of that waste passes out over the head pulley of conveyor 22 as the shot drop out 46. The fibrous segments themselves, which may still contain some shot waste, are airlifted through conduit 24 and deposited in the input of the centrifugal separator 25. The dust and air are removed from the separator by fan 27, through conduit 26. The mineral fiber material itself passes down through a rotary air seal rolls 28 to screen unit 29. Again, there is some shot-like waste output from the screen unit. The waste from this source and from conveyor 22, shown at 46, can be recycled.

The output from screen unit 29, which is to say the input to acceleration station 30, is the multiplicity of tightly clumped or entangled small prills or pellets of fiber material referred to above. This is usually the form of the mineral fiber material that is available for industrial use. Acceleration station 30 converts that mineral fiber material to more usable, and hence more valuable, form.

Acceleration station 30, as shown in FIG. 1, includes an external housing 31 in which the two multi-vaned or toothed acceleration rolls 32 and 33 are mounted in parallel relation to each other, separated by the acceleration passage or nip 35. Pellets 37, in the illustrated apparatus, fall at a moderate speed, under the influence of gravity, into the top of housing 31. But rolls 32 and 33 are rotatably driven at a high speed. As a consequence, when pellets 37 come into contact with the vanes or teeth 34 on the acceleration rolls, though impact forces are minimal the pellets are accelerated and stressed to a substantial extent. As a consequence, the stress on each pellet exceeds its internal bond strength and the pellet shreds into an open flake-like structure. This is the form of the material 39 that is discharged from housing 31 onto the output conveyor 41. The fibrous material formed by these shredded pellets is then collected and packaged in conventional equipment, ready for sale and subsequent industrial use.

FIG. 2 illustrates another acceleration station 50 that can be used as the final stage of system 10 instead of the previously described station 30. In this instance, acceleration station 50 includes only one acceleration roll 52 provided with a series of teeth or vanes 54. Acceleration roll 52 is mounted within a housing 51 that has an acceleration passage 55 around one side of the acceleration roll. Pellets 57 of fibrous mineral material dropping at a moderate speed into housing 51 of station 50 are greatly accelerated and subjected to substantial stress by the vanes or teeth 54 on roll 52. This stress causes them to shred and fall out of stage 50 in the form of shredded flake-like mineral fiber elements 59 that are ready for industrial use and can be packaged for that purpose. As with station 30, in station 50 shredding is effected by acceleration stress, not impact.

There are commercial devices that can be used, with some modification, for the final or acceleration stage of system 10. Thus, a Kirshner beater as used in some textile installations can be employed; the usual input nip or feed rolls are preferably omitted. The reason for elimination of the feed rolls in the Kirshner beater is due to the differences between conventional textile fibers and the glass-like mineral fibers produced in system 10. The mineral fibers have substantially shorter lengths and materially different aspect ratios than ordinary textile fibers. Other kinds of textile equipment, also requiring some modification in most instances, can be used for the acceleration stage at the output of system 10; these include two beater shredders, which are generally similar to the dual acceleration rolls in station 30 of FIG. 1, and bar pickers, which more closely resemble the single roll acceleration station 50 of FIG. 2. In both instances, input or feed rolls should be eliminated.

The mineral fiber product from an apparatus like system 10 is substantially more valuable than mineral fiber as produced by more conventional systems. The reason for the higher value is that the loose, shredded fibers that constitute the output of the system can be more readily dispersed in viscous liquids or in dry power formulations than is possible with previously known mineral fiber products. Consequently, the mineral fiber output from system 10 and its modifications can be incorporated in a substantially greater variety of new and existing product lines.

We claim:

1. An improved process for the manufacture of a flake-like mineral fiber material, comprising the steps of:
   A. melting a charge of raw mineral such as igneous rock, slag from a metal furnace, or the like to produce a molten mineral stream;
   B. spinning and attenuating the molten mineral stream of step A to form a fibrous mineral blanket containing some contaminants;
   C. severing the fibrous blanket of step B into a multiplicity of small segments;
   D. separating the contaminants from the small blanket segments of step C and generating a stream of a multiplicity of mineral fiber pellets of a maximum dimension X;
   the process improvement comprising:
   E. discharging the stream of mineral fiber pellets from step D into an acceleration passage, no smaller than X, containing an acceleration member;
   F. driving the acceleration member through the passage, in contact with the pellets, at a speed sufficient to accelerate and stress the mineral fiber pellets to shred those pellets and form a flake-like mineral fiber material including at least one shredded flake for each pellet; and
   G. removing the mineral fiber material for use.

2. An improved process for the manufacture of a flake-like mineral fiber material, according to claim 1, in which the stream of mineral fiber pellets from step D is discharged, in step E, into an acceleration passage bounded by and comprising the nip between two rotary acceleration members.

3. An improved process for the manufacture of a flake-like mineral fiber material, according to claim 1, in which the stream of mineral fiber pellets from step D is discharged, in step E, into an acceleration passage bounded on one side by a stationary housing and on the other side by a rotary acceleration member.

4. In a manufacturing system for the manufacture of a flake-like mineral fiber material, that system comprising, in sequence:
   furnace means for melting a charge of raw mineral such as igneous rock, slag from a metal furnace, or the like to produce a molten mineral stream;
   spinning means to produce mineral fibers from the molten mineral stream;
   collecting means for amalgamating the mineral fibers in a fibrous mineral blanket containing some contaminants;
   severing means for severing the fiber blanket into a multiplicity of small segments;
   separation means for separating contaminants from the small blanket segments and generating a stream of a multiplicity of mineral fiber pellets;
   the improvement comprising an acceleration station including:
   an acceleration station housing;
   at least one acceleration member positioned in the housing immediately adjacent to an acceleration passage;
   input means for directing the stream of mineral fiber pellets, at a moderate speed, into the acceleration passage;
   drive means for driving the acceleration member through the acceleration passage at a speed sufficient to stress the mineral fiber pellets, by acceleration, to convert those pellets into a multiplicity of flake-like, open, shredded mineral fiber elements; and
   an output conveyor.

5. An improved system for the manufacture of a flake-like mineral fiber material, according to claim 4, in which the acceleration passage is bounded by and comprises the nip between two rotary acceleration members.

6. An improved process for the manufacture of a flake-like mineral fiber material, according to claim 4, in which the acceleration passage is bounded on one side by a rotary acceleration member and on the other by a stationary housing.

7. An improved process for the manufacture of a flake-like mineral fiber material, according to claim 4, in which movement of the stream of mineral fiber pellets into the acceleration station is by gravity alone.

* * * * *